(12) United States Patent
Sugimoto (10) Patent No.: US 10,046,532 B2
(45) Date of Patent: *Aug. 14, 2018

(54) METHOD FOR MANUFACTURING PNEUMATIC TIRE

(75) Inventor: Mutsuki Sugimoto, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 718 days.

This patent is subject to a terminal disclaimer.

(21) Appl. No.: 13/882,608

(22) PCT Filed: Jun. 17, 2011

(86) PCT No.: PCT/JP2011/063936
§ 371 (c)(1),
(2), (4) Date: Apr. 30, 2013

(87) PCT Pub. No.: WO2012/066816
PCT Pub. Date: May 24, 2012

(65) Prior Publication Data
US 2013/0220519 A1    Aug. 29, 2013

(30) Foreign Application Priority Data
Nov. 17, 2010  (JP) .................. 2010-256727

(51) Int. Cl.
*B29D 30/30* (2006.01)
*B29D 30/46* (2006.01)
(Continued)

(52) U.S. Cl.
CPC ......... *B29D 30/30* (2013.01); *B29D 30/3007* (2013.01); *B29D 30/46* (2013.01);
(Continued)

(58) Field of Classification Search
CPC .................. B29D 30/3007; B29D 30/30; B29D 30/3042; B29D 2030/0682;
(Continued)

(56) References Cited

U.S. PATENT DOCUMENTS 4,542,466 A    9/1985  Arimatsu
4,910,321 A    3/1990  Kennedy et al.
(Continued)

FOREIGN PATENT DOCUMENTS

CN    1743166 A     3/2006
CN  101102883 A     1/2008
(Continued)

OTHER PUBLICATIONS

Machine translation of JP 2010-005986-A, patent document published Jan. 14, 2010.*

(Continued)

*Primary Examiner* — Geoffrey L Knable
(74) *Attorney, Agent, or Firm* — Birch, Stewart, Kolasch & Birch, LLP (57) ABSTRACT

A method for manufacturing a pneumatic tire including: (a) an assembly step of bonding the inner liner and an unvulcanized rubber sheet with end portions thereof in a width direction being displaced from each other in the range of 50 mm to 500 mm in the width direction to manufacture a laminate; (b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet.

3 Claims, 6 Drawing Sheets (51) Int. Cl.
  *B60C 1/00* (2006.01)
  *B29D 30/06* (2006.01)
  *B60C 5/14* (2006.01)
(52) U.S. Cl.
  CPC .... B60C 1/0008 (2013.01); *B29D 2030/0682* (2013.01); *B29D 2030/3085* (2013.01); *B60C 2005/145* (2013.01)
(58) Field of Classification Search
  CPC .... B29D 2030/3085; B29D 2030/3092; B29D 2030/423; B60C 1/0008; B60C 5/14; B60C 2005/145; B60C 2005/147
  USPC .......................... 156/123, 133, 134; 152/510
  See application file for complete search history.

(56) References Cited

U.S. PATENT DOCUMENTS

| | | | |
|---|---|---|---|
| 4,946,899 A | 8/1990 | Kennedy et al. | |
| 5,219,948 A | 6/1993 | Storey et al. | |
| 5,428,111 A | 6/1995 | Faust et al. | |
| 5,548,029 A | 8/1996 | Powers et al. | |
| 6,462,131 B1 | 10/2002 | Tse et al. | |
| 2006/0042740 A1 | 3/2006 | Takahashi et al. | |
| 2008/0249236 A1 | 10/2008 | Nakashima et al. | |
| 2009/0032155 A1* | 2/2009 | Matsuzawa | B60C 17/01 152/152 |
| 2009/0205770 A1 | 8/2009 | Matsuda | |
| 2009/0218024 A1 | 9/2009 | Tsou et al. | |
| 2010/0024941 A1 | 2/2010 | Hara et al. | |
| 2010/0051158 A1 | 3/2010 | Albert et al. | |
| 2010/0181000 A1 | 7/2010 | Takahashi | |
| 2010/0294411 A1* | 11/2010 | Custodero | B60C 1/0008 152/511 |
| 2010/0314030 A1 | 12/2010 | Hashimura et al. | |
| 2011/0011511 A1 | 1/2011 | Miyazaki et al. | |
| 2011/0056604 A1 | 3/2011 | Sugimoto | |
| 2011/0180193 A1 | 7/2011 | Custodero et al. | |
| 2012/0003413 A1* | 1/2012 | Lesage | B29D 30/0681 428/36.6 |
| 2012/0048441 A1 | 3/2012 | Takahashi et al. | |

FOREIGN PATENT DOCUMENTS

| | | | |
|---|---|---|---|
| CN | 101616790 A | | 12/2009 |
| EP | 0 206 756 A2 | | 12/1986 |
| EP | 2172349 A1 | | 4/2010 |
| FR | 2917010 A1 | | 12/2008 |
| FR | 2939076 A1 | | 6/2010 |
| JP | 62-48704 A | | 3/1987 |
| JP | 64-62308 A | | 3/1989 |
| JP | 3-174403 A | | 7/1991 |
| JP | 6-107896 A | | 4/1994 |
| JP | 8-217922 A | | 8/1996 |
| JP | 9-165469 A | | 6/1997 |
| JP | 2003-71844 A | | 3/2003 |
| JP | 2008-24215 A | | 2/2008 |
| JP | 2008-221638 A | | 9/2008 |
| JP | 2009-149711 A | | 7/2009 |
| JP | 2009-208444 A | | 9/2009 |
| JP | 2010-5986 A | | 1/2010 |
| JP | 2010-507510 A | | 3/2010 |
| JP | 2010-100082 A | * | 5/2010 |
| JP | 2010-100083 A | | 5/2010 |
| JP | 2010-100675 A | * | 5/2010 |
| JP | 2010-167829 A | | 8/2010 |
| JP | 2012-510389 A | | 5/2012 |
| WO | WO 2005/033035 A1 | | 4/2005 |
| WO | WO 2006/132238 A1 | | 12/2006 |
| WO | WO 2007/050061 A1 | | 5/2007 |
| WO | WO-2008/154996 A1 | * | 12/2008 |
| WO | WO 2009/119232 A1 | | 10/2009 |
| WO | WO 2009/156049 A1 | | 12/2009 |
| WO | WO-2010/063427 A1 | * | 6/2010 |
| WO | WO 2010/119668 A1 | | 10/2010 |

OTHER PUBLICATIONS

Machine translation of JP 2008-221638-A, patent document published Sep. 25, 2008.*
Extended European Search Report for European Application No. 11002977.4 dated Oct. 19, 2011.
Japanese Office Action for Japanese Application No. 2010-236045 dated May 29, 2012, with the English translation.

* cited by examiner

METHOD FOR MANUFACTURING PNEUMATIC TIRE

TECHNICAL FIELD

The present invention relates to a method for manufacturing a pneumatic tire, in particular to a method for molding an inner liner, and to a method for manufacturing a pneumatic tire including the step of molding a green tire by manufacturing a laminate of an inner liner and an unvulcanized rubber sheet such as a carcass ply.

BACKGROUND ART

Recently, weight saving of tires has been pursued because of strong social demands for fuel efficiency of automobiles. Of tire members, weight saving has also been required for an inner liner serving as an air shutoff layer, which is disposed inside a tire and is required to reduce leakage of air from the inside to the outside of a pneumatic tire.

At present, for a rubber composition for the air shutoff layer, rubber formulation mainly composed of butyl rubber which contains, for example, 70 to 100% by mass of butyl rubber and 30 to 0% by mass of natural rubber is used to improve air permeation resistance of the tire. Further, the rubber formulation mainly composed of butyl rubber contains, in addition to butylene, about 1% by mass of isoprene, which allows intermolecular co-crosslinking with an adjacent rubber layer along with sulfur, a vulcanization accelerator, and zinc white. The butyl-based rubber having general formulation is required to have a thickness of about 0.6 to 1.0 mm for tires for passenger cars, and a thickness of about 1.0 to 2.0 mm for tires for trucks and buses. To pursue weight saving of tires, there has been a demand for a polymer which is more excellent in air permeation resistance and allows a further reduction in the thickness of the air shutoff layer, when compared with the butyl-based rubber.

Figure 7:
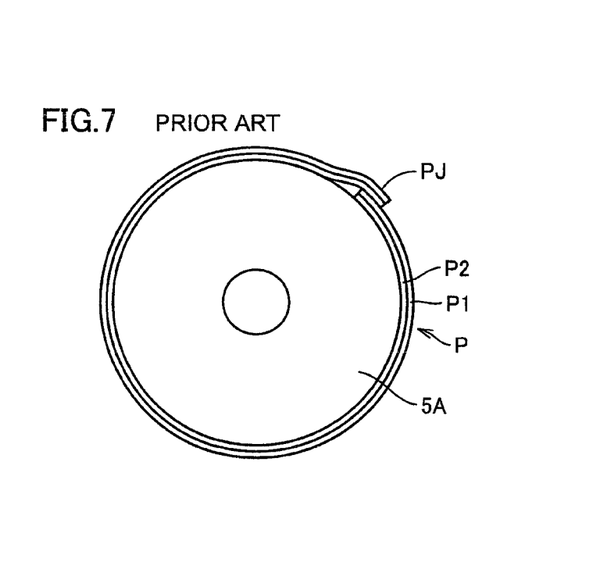
FIG. 7 is a schematic view of a conventional method for molding an inner liner.

In molding a green tire for a pneumatic tire, when an inner liner P is molded on a drum 5A as shown in FIG. 7, generally, an inner liner film P2 is bonded to an unvulcanized inner liner rubber P1 beforehand on a conveyer, with positions of both end edges in a longitudinal direction being aligned, to produce a laminate, the laminate is wound on a band over its entire circumference with inner liner film P2 of the laminate being disposed on an inner surface side, both end portions of the laminate are overlapped with each other at one location on the circumference to form a joint PJ, and thereafter a stitching roller is used to press joint PJ of the laminate and remove air.

In such a technique, since inner liner film P2 and unvulcanized inner liner rubber P1 are bonded beforehand with the positions of their both end edges in the longitudinal direction being aligned, and thereafter wound on the drum, joint PJ formed on the circumference of drum 5A inevitably has a large thickness when the both end portions of the laminate are overlapped and joined on the drum. Thus, even if the stitching roller is applied over joint PJ, air may remain at joint PJ, and if the remaining air expands by vulcanization molding of the green tire, joint PJ of laminate P may peel off.

In addition, since the end portions of laminate P form the joint at one location on the circumference of drum 5A in this technique, peeling-off of the joint of the inner liner of the molded green tire may cause a damage to an adjacent carcass ply.

It has been proposed in conventional techniques to use a thermoplastic elastomer for an inner liner with the intention to achieve weight saving of a pneumatic tire. However, the material, which is thinner and has a higher air permeation resistance than an inner liner made of butyl-based rubber, is inferior to the inner liner made of butyl-based rubber in vulcanization adhesive strength with insulation rubber and carcass ply rubber adjacent to the inner liner.

In particular, if the joint of the inner liner has a weak adhesive strength, the joint may peel off during driving, which may cause a reduction in the internal pressure of the tire, and burst of the tire. Further, since the joint has a structure in which another member is exposed inside, an air leakage path may be formed, and a reduction in the internal pressure of the tire is likely to be caused.

Patent Literature 1 (Japanese Patent Laying-Open No. 2009-208444) discloses a technique of molding an unvulcanized tire by bonding an inner liner film and an unvulcanized rubber sheet with both ends in an extending direction being displaced from each other, and winding the tacky body on a drum.

However, in order to displace the both ends in the extending direction from each other, it is necessary to cut each member one by one to have a constant size, and individually bond the members with being displaced from each other, which may deteriorate productivity. Further, depending on the bonding method, accuracy is deteriorated and air remains between the films, which may cause a damage during vulcanization of the tire.

CITATION LIST

Patent Literature

PTL 1: Japanese Patent Laying-Open No. 2009-208444

SUMMARY OF INVENTION

Technical Problem

The present invention is directed to a method for molding a tire by winding a laminate of an inner liner and an unvulcanized rubber sheet such as a carcass ply on a molding drum, the inner liner and the unvulcanized rubber sheet being laminated beforehand and wound on the drum. On that occasion, the inner liner and the unvulcanized rubber sheet are bonded with being displaced from each other in a width direction to manufacture the laminate. Thereby, one object of the present invention is to enhance uniformity in thickness at a joint on the circumference of the drum, to prevent air from remaining, and also to effectively reduce peeling-off of the joints of the inner liner and the carcass ply.

Solution to Problem

The present invention relates to a method for manufacturing a pneumatic tire having an inner liner on an inner side of the tire, molding of a green tire including:

(a) an assembly step of bonding the inner liner and an unvulcanized rubber sheet with end portions thereof in a width direction being displaced from each other by 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance, the inner liner being a composite layer of a first layer containing a styrene-isobutylene-styrene block copolymer and having a thickness of 0.05 mm to 0.6 mm and a second layer disposed on a side of the unvulcanized rubber sheet, made of a thermoplastic elastomer, and having a thickness of 0.01 mm to 0.3 mm.

The present invention relates to the method for manufacturing the pneumatic tire wherein, in the assembly step, the inner liner and the unvulcanized rubber sheet have different widths, and both end portions thereof in the width direction are displaced in the width direction so as not to overlap each other, to manufacture the laminate.

Preferably, in the present invention, the second layer is a thermoplastic elastomer containing at least one of a styrene-isoprene-styrene block copolymer and a styrene-isobutylene block copolymer. Preferably, in the present invention, the unvulcanized rubber sheet is a carcass ply.

Advantageous Effects of Invention

In the present invention, the inner liner, which is made of the composite layer of the first layer containing an SIBS and the second layer of a thermoplastic elastomer, and the unvulcanized rubber sheet are laminated with being displaced from each other in the width direction, the laminate is wound on the drum over its entire circumference with the inner liner being disposed on the inner surface side, and the end portions of the inner liner and the end portions of the unvulcanized rubber sheet are each joined at the positions apart from each other in the circumferential direction of the drum. Thereby, a step difference in thickness at a joint of the inner liner and a joint of the unvulcanized rubber sheet can be alleviated. In addition, air at these joints can be reliably removed by stitching, and thus peeling-off of the joints due to remaining air can be reduced.

Further, since the joints apart from each other in the circumferential direction are formed in the molded inner liner and unvulcanized rubber sheet such as a carcass ply, even if the joint of the carcass ply peels off, the peel-off portion is reinforced by the inner liner, and thus damage and breakage of a product tire is alleviated.

In particular, in the present invention, since the inner liner is the composite layer of the first layer disposed on the inner side of the tire, made of a styrene-isobutylene-styrene block copolymer, and having a thickness of 0.05 mm to 0.6 mm, and the second layer disposed on the side of the unvulcanized rubber sheet, made of a thermoplastic elastomer, and having a thickness of 0.01 mm to 0.3 mm, adhesive strength with rubber of the adjacent carcass ply is enhanced. In addition, the inner liner has a high reinforcing effect when the joint of the carcass ply peels off, and the carcass ply has a high reinforcing effect when the joint of the inner liner peels off

BRIEF DESCRIPTION OF DRAWINGS

FIG. 4($a$) is a cross sectional view of a laminate, and FIG. 4($b$) is a schematic view showing the state where the laminate is wound on a drum.
FIG. 6($a$) is a cross sectional view of a laminate, and FIG. 6($b$) is a schematic view showing the state where the laminate is wound on the drum.

DESCRIPTION OF EMBODIMENTS

The present invention is directed to a method for manufacturing a pneumatic tire having an inner liner on an inner side of the tire, the manufacturing method being performed through the following step of molding a green tire including:

(a) an assembly step of bonding the inner liner and an unvulcanized rubber sheet with end portions thereof in a width direction being displaced from each other in the range of 50 mm to 500 mm in the width direction to manufacture a laminate;

(b) a cutting step of cutting the laminate to have a constant length corresponding to a width of a drum to manufacture a cut sheet; and (c) a joining step of winding the cut sheet on entire circumference of the drum such that a cut surface thereof extends in a circumferential direction of the drum and the inner liner is disposed on an inner surface side, and joining the end portions of the inner liner and joining the end portions of the unvulcanized rubber sheet such that positions of the joined end portions are displaced by a constant distance.

Here, the method for manufacturing the pneumatic tire in accordance with the present invention will be described with reference to the drawings.

Embodiment 1

<Assembly Step>

Figure 1:
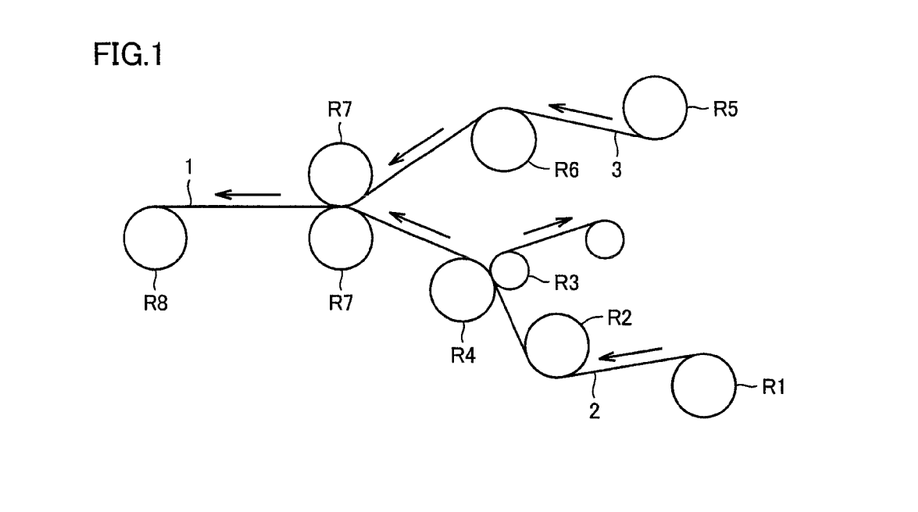
FIG. 1 is a schematic view showing an assembly step.
Figure 2:
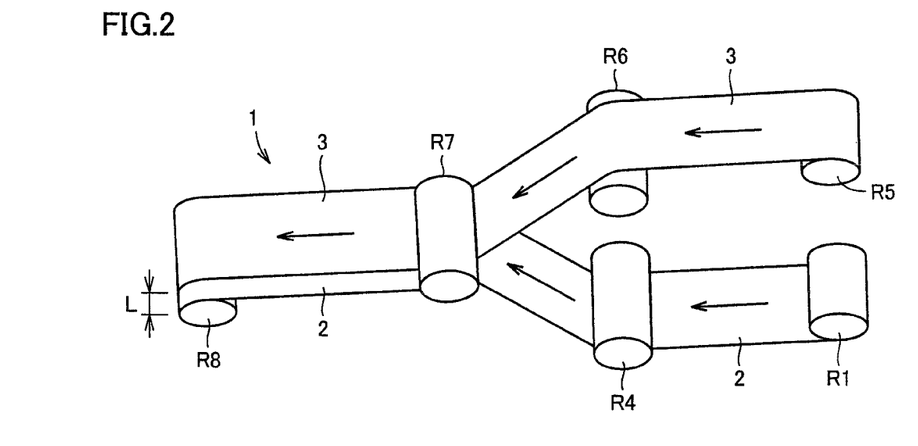
FIG. 2 is a perspective view schematically showing the assembly step.

FIG. 1 is a schematic lateral view showing the assembly step, and FIG. 2 is a schematic perspective view showing the assembly step. In FIGS. 1 and 2, a film-like inner liner 2 covered with exfoliate paper is fed from a storage roll R1 via a first drive roller R2 in a direction indicated by an arrow, and is separated from the exfoliate paper at peel-off rollers R3, R4. Then, inner liner 2 is fed to a pair of calender rolls R7.

On the other hand, an unvulcanized rubber sheet 3 is fed via a second drive roller R6 to the pair of calender rolls R7. Inner liner 2 and unvulcanized rubber sheet 3 are bonded there to manufacture a laminate 1. Laminate 1 is taken up by a take-up roll R8 for temporary storage, or is continuously fed to the subsequent cutting step. Here, inner liner 2 and unvulcanized rubber sheet 3 having a substantially identical width are used, and positions of their both ends are displaced from each other to form a distance L.

Here, displaced distance L is adjusted in the range of 50 mm to 500 mm, preferably in the range of 100 mm to 300 mm. If displaced distance L is less than 50 mm, a space between a joint of the unvulcanized rubber sheet and a joint of the inner liner is small, and adhesion failure at the joints is likely to occur. On the other hand, if displaced distance L is more than 500 mm, it is difficult to mold a tire on a drum.

The inner liner is composed of a composite layer of a first layer made of a styrene-isobutylene-styrene block copolymer and having a thickness of 0.05 mm to 0.6 mm and a second layer disposed on a side of the unvulcanized rubber sheet, made of a thermoplastic elastomer, and having a thickness of 0.01 mm to 0.3 mm. The width of the inner liner is adjusted depending on the size of the tire.

In the present invention, since the inner liner and the unvulcanized rubber sheet are pressure-bonded using the rolls, they can be closely bonded reliably with no air left therebetween, and they can be bonded efficiently and with good productivity.

<Cutting Step>

Figure 3:
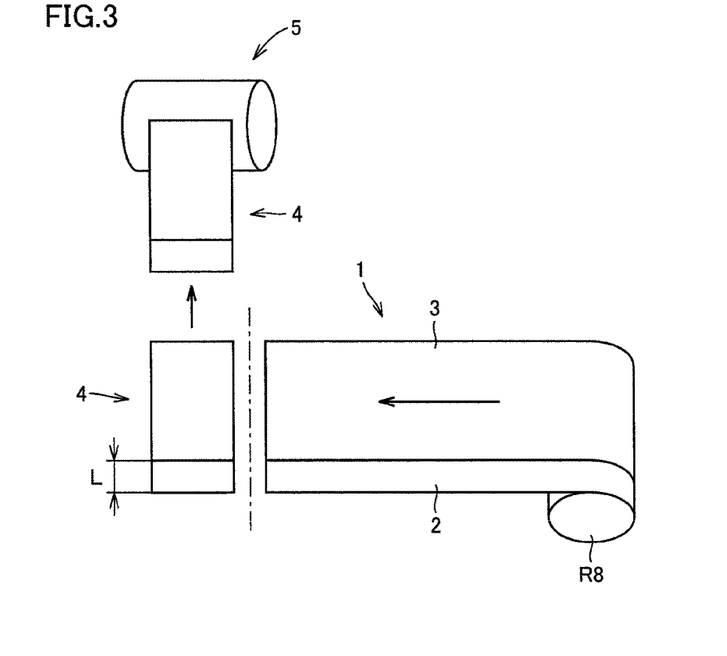
FIG. 3 is a schematic view showing a cutting step.

FIG. 3 is a schematic perspective view showing the cutting step. Laminate 1 is fed from take-up roll R8, or continuously from the assembly step, to a cutter by a belt conveyor. Laminate 1 is cut to have a predetermined length in a longitudinal direction in accordance with the size of the tire to manufacture a cut sheet 4. A conventional technique such as cutting with a knife can be adopted to cut the laminate. A cutting direction of cut sheet 4 corresponds to a circumferential direction of a drum, and a cutting length thereof in the longitudinal direction corresponds to a width direction of drum 5. Further, the length of the inner liner is adjusted as appropriate depending on the size of the tire.

<Joining Step>

Figure 4:
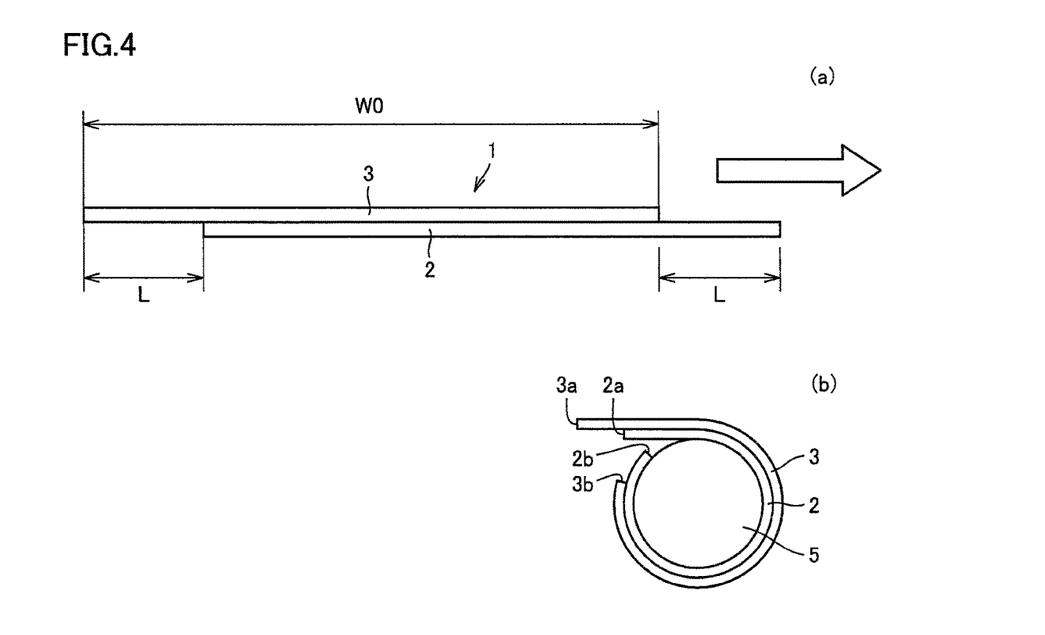

FIG. 4 is a schematic view showing the joining step for the laminate, in which FIG. 4(a) is a cross sectional view of cut sheet 4, and FIG. 4(b) is a schematic view showing a method for winding cut sheet 4 on drum 5. The laminate is wound such that inner liner 2 is adjacent to the surface of drum 5. Here, a position where end portions 2a, 2b of the inner liner are joined each other to form the joint and a position where end portions 3a, 3b of the unvulcanized rubber sheet are joined each other to form the joint are offset from each other.

<Tire Molding/Vulcanization Step>

As described above, in the joining step, the laminate of the inner liner and an unvulcanized carcass ply is manufactured and formed into a cylindrical shape on the drum. After the joining step, both end portions of the laminate located at both ends of the drum are folded back around bead cores, and thereafter a central portion of the laminate made of the inner liner and the unvulcanized carcass ply is expanded and deformed while narrowing a space between the bead cores. In association with this operation, a belt member, tread rubber, and the like are bonded to the central portion of the laminate, and other rubber members such as a side wall, a bead apex, and the like are also bonded to mold a green tire. The green tire molded as described above is introduced into a mold and vulcanized by a conventional method to obtain a product tire.

Embodiment 2

Although inner liner 2 and unvulcanized rubber sheet 3 having an identical width are used in Embodiment 1, inner liner 2 in the present embodiment has a width W2 formed to be larger than a width W1 of unvulcanized rubber sheet 3.

Figure 5:
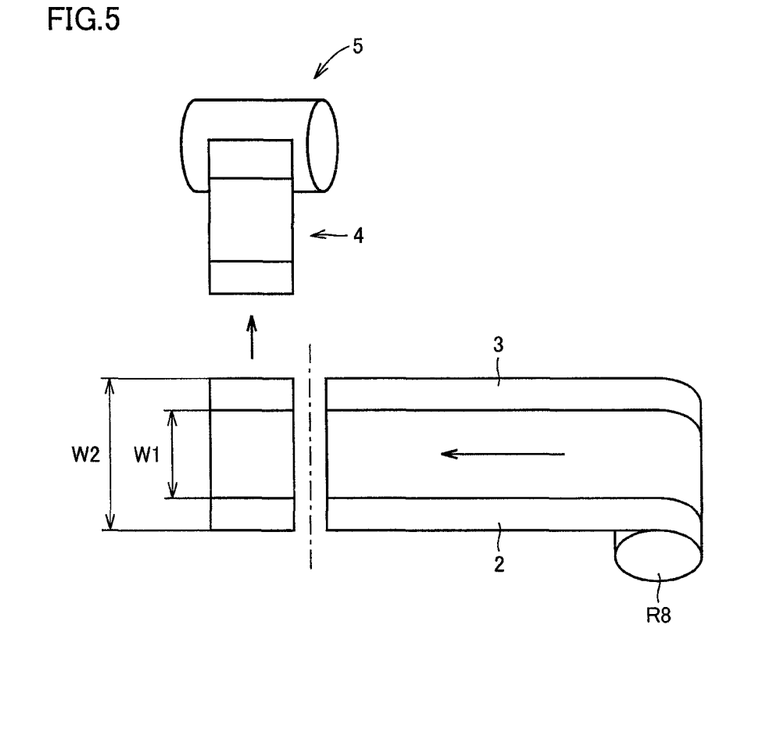
FIG. 5 is a schematic view showing the cutting step.

FIG. 5 is a schematic view showing the cutting step. Laminate 1 is fed from take-up roll R8, or continuously from the assembly step, to a cutter by a belt conveyor. Laminate 1 is cut to have a predetermined length in the longitudinal direction in accordance with the size of the tire to manufacture cut sheet 4. A conventional technique such as cutting with a knife can be adopted to cut the laminate. The cutting direction of cut sheet 4 corresponds to the circumferential direction of the drum, and the cutting length thereof in the longitudinal direction corresponds to the width direction of drum 5.

FIG. 6(a) is a cross sectional view of the laminate, and FIG. 6(b) is a schematic view showing the state where the laminate is wound on the drum. Here, the laminate is wound such that inner liner 2 is on and in contact with drum 5, and end portions 2a, 2b thereof are overlapped to form a joint. Thereon, end portions 3a, 3b of unvulcanized rubber sheet 3 such as an insulation are joined using an unvulcanized rubber piece 6. In this case, two joints are formed at positions that are offset from the position of the joint of the inner liner.

<Inner Liner>

In the present invention, the inner liner is composed of the first layer disposed on the inner side of the tire, and the second layer disposed in contact with a rubber layer of the carcass ply. The first layer is a thermoplastic elastomer composition mainly composed of a styrene-isobutylene-styrene block copolymer (hereinafter also referred to as an "SIBS"), and the second layer is a thermoplastic elastomer composition.

<First Layer>

The first layer is made of a thermoplastic elastomer composition mainly composed of a styrene-isobutylene-styrene block copolymer (SIBS). Since the SIBS is derived from an isobutylene block, a polymer film made of the SIBS has excellent air permeation resistance. Therefore, when a polymer made of the SIBS is used for the inner liner, a pneumatic tire having excellent air permeation resistance can be obtained.

Further, the SIBS has excellent durability since a molecular structure other than those of aromatic molecules is completely saturated and therefore deterioration and hardening are suppressed. Therefore, when a polymer film made of the SIBS is used for the inner liner, a pneumatic tire having excellent durability can be obtained.

When a pneumatic tire is manufactured by using a polymer film made of the SIBS for the inner liner, air permeation resistance can be ensured. Therefore, it is not necessary to use a halogenated rubber having high specific gravity such as halogenated butyl rubber, which has been conventionally used to impart air permeation resistance, and even if the halogenated rubber is used, the amount of use can be reduced. This enables weight saving of the tire and improves fuel efficiency.

Although there is no particular limitation on the molecular weight of the SIBS, the weight-average molecular weight obtained by GPC measurement is preferably 50,000 to 400,000 in view of fluidity, molding step, rubber elasticity, and the like. When the weight-average molecular weight is less than 50,000, tensile strength and tensile elongation may decrease. When the weight-average molecular weight is more than 400,000, extrusion moldability may deteriorate. Therefore, both the cases are not preferred. Since the SIBS further improves air permeation resistance and durability, the content of a styrene component in the SIBS is 10 to 30% by mass, preferably 14 to 23% by mass.

In the SIBS as a copolymer, the polymerization degree of each block is preferably about 10,000 to 150,000 for isobutylene and about 5,000 to 30,000 for styrene, in view of rubber elasticity and handling (when the polymerization degree is less than 10,000, the SIBS becomes a liquid).

The SIBS can be obtained by a conventional living cationic polymerization method for a vinyl-based compound. For example, Japanese Patent Laying-Open No. 62-048704 and Japanese Patent Laying-Open No. 64-062308 disclose that living cationic polymerization of isobutylene with other vinyl compounds can be performed, and a polyisobutylene-based block copolymer can be manufactured by using isobutylene and other compounds as the vinyl compounds.

The thickness of the first layer made of the SIBS is 0.05 to 0.6 mm. When the thickness of the first layer is less than 0.05 mm, the first layer may be broken by a pressing pressure during vulcanization of a green tire in which a polymer laminate is used as the inner liner, and thus an air leak phenomenon may occur in the resultant tire. On the other hand, when the thickness of the first layer is more than 0.6 mm, tire weight increases and fuel efficiency performance deteriorates. The thickness of the first layer is more preferably 0.05 to 0.4 mm. The first layer can be obtained by forming the SIBS into a film by a conventional method of forming a thermoplastic resin or a thermoplastic elastomer into a film, such as extrusion molding or calender molding.

The first layer is mainly composed of the SIBS. Specifically, the first layer contains more than or equal to 90% by mass of the SIBS in a thermoplastic elastomer component. Here, as the thermoplastic elastomer, a styrene-based thermoplastic elastomer, a urethane-based thermoplastic elastomer, or the like can be used.

<Second Layer>

In the present invention, the second layer is composed of a thermoplastic elastomer, in particular a styrene-based thermoplastic elastomer composition. Here, a styrene-based thermoplastic elastomer refers to a copolymer containing a styrene block as a hard segment. Examples thereof include a styrene-isoprene-styrene block copolymer (hereinafter also referred to as an "SIS"), a styrene-isobutylene block copolymer (hereinafter also referred to as an "SIB"), a styrene-butadiene-styrene block copolymer (hereinafter also referred to as an "SBS"), a styrene-isobutylene-styrene block copolymer (hereinafter also referred to as an "SIBS"), a styrene-ethylene-butene-styrene block copolymer (hereinafter also referred to as an "SEBS"), a styrene-ethylene-propylene-styrene block copolymer (hereinafter also referred to as an "SEPS"), a styrene-ethylene-ethylene-propylene-styrene block copolymer (hereinafter also referred to as an "SEEPS"), and a styrene-butadiene-butylene-styrene block copolymer (hereinafter also referred to as an "SBBS").

Further, the styrene-based thermoplastic elastomer may have an epoxy group in its molecular structure, and for example an epoxy-modified styrene-butadiene-styrene copolymer (epoxidized SBS) such as Epofriend A1020 manufactured by Daicel Chemical Industries, Ltd. (weight-average molecular weight of 100,000, epoxy equivalent of 500) can be used.

Of the styrene-based thermoplastic elastomers used for the second layer, the styrene-isoprene-styrene copolymer (SIS) and the SIB are particularly suitable. Since an isoprene block of the SIS is a soft segment, a polymer film made of the SIS is easily vulcanization-bonded with a rubber component. Therefore, when the polymer film made of the SIS is used for the inner liner, the inner liner is excellent in adhesiveness with the rubber layer of the carcass ply, for example, and thus a pneumatic tire excellent in durability can be obtained.

Although there is no particular limitation on the molecular weight of the SIS, the weight-average molecular weight obtained by the GPC measurement is preferably 100,000 to 290,000 in view of rubber elasticity and moldability. When the weight-average molecular weight is less than 100,000, tensile strength may decrease. When the weight-average molecular weight is more than 290,000, extrusion moldability may deteriorate. Therefore, both the cases are not preferred. The content of a styrene component in the SIS is preferably 10 to 30% by mass in view of tackiness, adhesiveness, and rubber elasticity.

In the present invention, the polymerization degree of each block in the SIS is preferably about 500 to 5,000 for isoprene and about 50 to 1,500 for styrene, in view of rubber elasticity and handling.

The SIS can be obtained by a conventional polymerization method for a vinyl-based compound, and can be obtained, for example, by the living cationic polymerization method. An SIS layer can be obtained by forming the SIS into a film by a conventional method of forming a thermoplastic resin or a thermoplastic elastomer into a film, such as extrusion molding or calender molding.

Since an isobutylene block of the styrene-isobutylene block copolymer (SIB) is a soft segment, a polymer film made of the SIB is easily vulcanization-bonded with a rubber component. Therefore, when the polymer film made of the SIB is used for the inner liner, the inner liner is excellent in adhesiveness with an adjacent rubber constituting a carcass or an insulation, for example, and thus a pneumatic tire excellent in durability can be obtained.

It is preferable to use one having a linear chain as the SIB in view of rubber elasticity and adhesiveness. Although there is no particular limitation on the molecular weight of the SIB, the weight-average molecular weight obtained by the GPC measurement is preferably 40,000 to 120,000 in view of rubber elasticity and moldability. When the weight-average molecular weight is less than 40,000, tensile strength may decrease. When the weight-average molecular weight is more than 120,000, extrusion moldability may deteriorate. Therefore, both the cases are not preferred.

The content of a styrene component in the SIB is preferably 10 to 35% by mass in view of tackiness, adhesiveness, and rubber elasticity.

In the present invention, the polymerization degree of each block in the SIB is preferably about 300 to 3,000 for isobutylene and about 10 to 1,500 for styrene, in view of rubber elasticity and handling.

The SIB can be obtained by a conventional living polymerization method for a vinyl-based compound. For example, methylcyclohexane, n-butyl chloride, and cumyl chloride are charged in a stirrer, cooled to −70° C. and thereafter reacted for 2 hours, and then the reaction is terminated by adding a large amount of methanol, and the reaction product is vacuum-dried at 60° C. Thereby, the SIB can be manufactured.

An SIB layer can be molded by subjecting the SIB to a conventional method of forming a styrene-based thermoplastic elastomer into a film, such as extrusion molding or calender molding. The thickness of the second layer is preferably 0.01 mm to 0.3 mm. Here, when the second layer is made of, for example, a single layer such as the SIS or SIB layer, the thickness of the second layer refers to a thickness of the single layer. On the other hand, when the second layer is made of, for example, two or three layers including the SIS layer, the SIB layer, and the like, the thickness of the second layer refers to the total thickness of these layers. When the thickness of the second layer is less than 0.01 mm, the second layer may be broken by a pressing pressure during vulcanization of the green tire in which the polymer laminate is used as the inner liner, and thus vulcanization adhesive strength may be reduced. On the other hand, when the thickness of the second layer is more than 0.3 mm, tire weight may increase and fuel efficiency performance may deteriorate. The thickness of the second layer is more preferably 0.05 to 0.2 mm.

Although the second layer is preferably composed of a composite layer of the SIS layer and the SIB layer, a film made of urethane rubber or silicone rubber can be further disposed as a third layer, between the first layer and the SIS layer, between the first layer and the SIB layer, or between the SIS layer and the SIB layer.

<Polymer Laminate>

In the present invention, a polymer laminate composed of a composite layer of the first layer and the second layer is used as the inner layer. Here, the first layer and the second layer are thermoplastic elastomer compositions, and are in a softened state in the mold at a vulcanization temperature, for example 150 to 180° C. The softened state refers to an intermediate state between a solid and a liquid with improved molecular mobility. Further, since a thermoplastic elastomer composition in the softened state has an improved reactivity than in the solid state, it adheres to or is bonded with an adjacent member. Accordingly, in order to manufacture a tire, a cooling step is required to prevent a change in the shape of a thermoplastic elastomer and its adhesion or fusion to the adjacent member. In the cooling step, the inside of a bladder portion is cooled rapidly to 50 to 120° C. for 10 to 300 seconds after vulcanization of the tire. As a cooling medium, at least one selected from air, steam, water, and oil is used. By adopting such a cooling step, a thin inner liner in the range of 0.05 to 0.9 mm can be formed.

<Structure of Tire>

Figure 8:
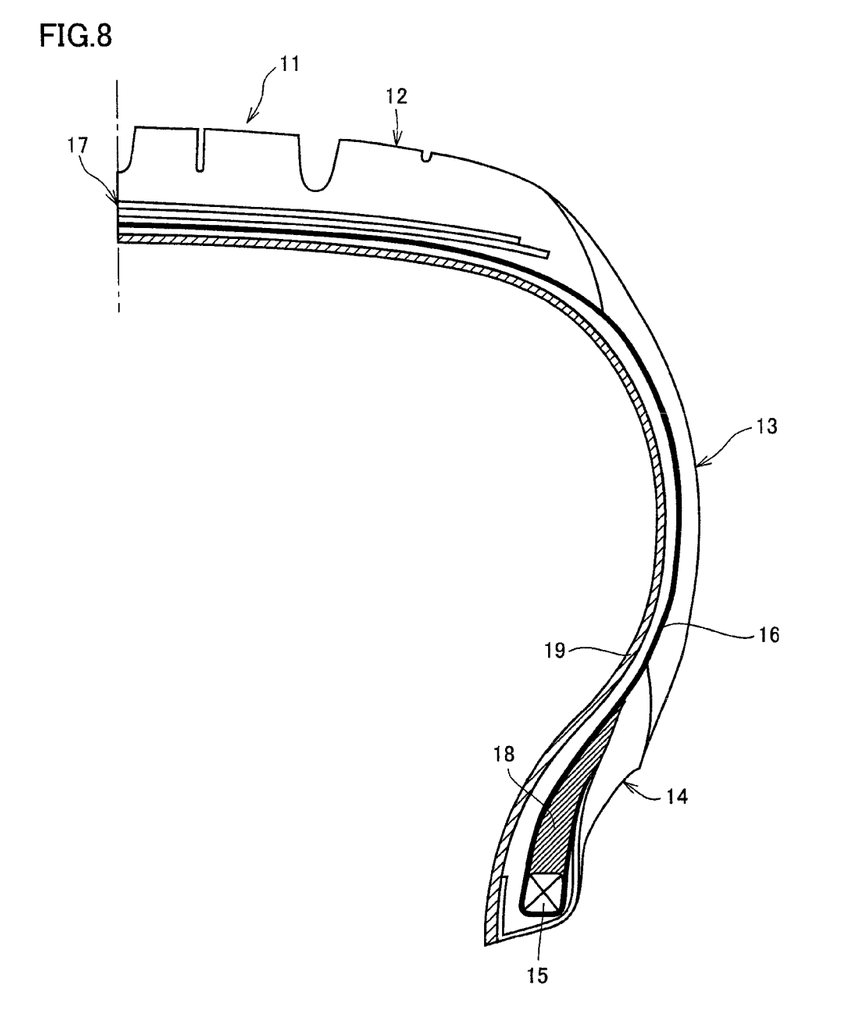
FIG. 8 is a schematic cross sectional view of a pneumatic tire.

A pneumatic tire having an inner liner on an inner side of the tire in accordance with the present invention will be described with reference to the drawings. FIG. 8 is a schematic cross sectional view of the right half of the pneumatic tire. In the drawing, a pneumatic tire 11 has a tread part 12, and a sidewall part 13 and a bead part 14 forming a toroidal shape from both ends of the tread part. Further, a bead core 15 is embedded in bead part 14. Also provided are a carcass ply 16 arranged to extend from one bead part 14 to the other bead part with each of both ends being folded back around bead core 15 and locked, and a belt layer 17 composed of at least two plies on an outer side of carcass ply 16 at a crown part.

The two plies of belt layer 17, each being usually made of a steel cord or a cord of aramid fiber or the like, are arranged so that the cords intersect with each other between the plies and each form an angle of usually 5 to 30° with respect to a tire circumferential direction. A topping rubber layer can be provided on an outer side of each of both ends of the belt layer to reduce peeling-off at the both ends of the belt layer. Regarding the carcass ply, organic fiber cords made of polyester, nylon, aramid or the like are arranged at an angle of about 90° with respect to the tire circumferential direction, and a bead apex 18 extending from the top end of bead core 15 toward the sidewall is disposed in a region surrounded by the carcass ply and the folded part thereof. An inner liner 19 extending from one bead part 14 to the other bead part 14 is disposed on a tire radial inner side of carcass ply 16.

Figure 9:
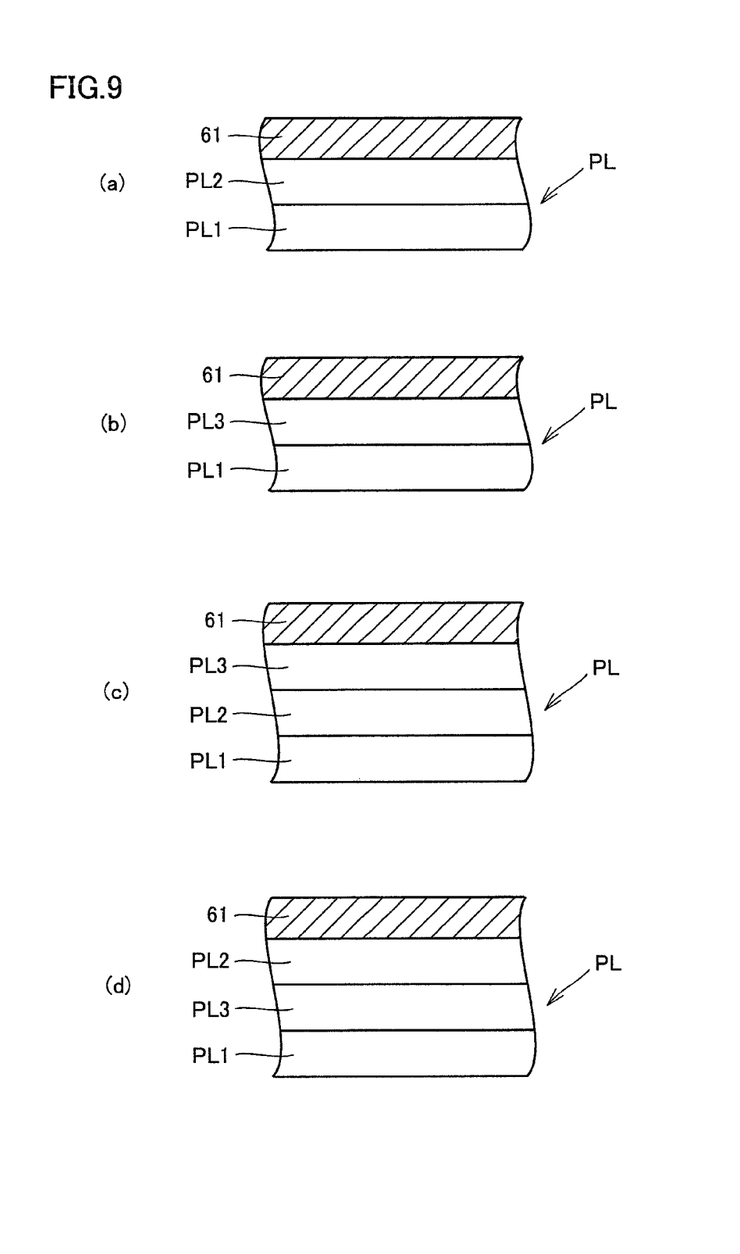
FIG. 9 is a schematic cross sectional view of a polymer laminate.

Next, the state of arrangement of the inner liner with respect to the carcass ply in a vulcanized tire will be specifically shown in FIG. 9. In FIG. 9(a), a polymer laminate PL is composed of a first layer PL1 and an SIS-based layer (a layer mainly composed of the SIS) PL2 as a second layer. When polymer laminate PL is used as the inner liner of the pneumatic tire, if SIS-based layer PL2 is arranged toward a tire radial outer side so as to contact carcass ply 61, adhesive strength between SIS-based layer PL2 and carcass ply 61 can be enhanced in the tire vulcanization step. Therefore, the resultant pneumatic tire can have excellent air permeation resistance and durability, since the inner liner is satisfactorily bonded with a rubber layer of carcass ply 61.

In FIG. 9(b), polymer laminate PL is composed of first layer PL1 and an SIB-based layer PL3 as a second layer. When polymer laminate PL is used as the inner liner of the pneumatic tire, if a surface of SIB-based layer PL3 is arranged toward the tire radial outer side so as to contact carcass ply 61, adhesive strength between SIB-based layer PL3 and carcass ply 61 can be enhanced in the tire vulcanization step. Therefore, the resultant pneumatic tire can have excellent air permeation resistance and durability, since the inner liner is satisfactorily bonded with the rubber layer of carcass ply 61.

In FIG. 9(c), polymer laminate PL is composed of first layer PL1 and SIS-based layer PL2 and SIB-based layer PL3 as a second layer, laminated in the order listed above. When polymer laminate PL is used as the inner liner of the pneumatic tire, if a surface of SIB-based layer PL3 is arranged toward the tire radial outer side so as to contact carcass ply 61, adhesive strength between SIB-based layer PL3 and carcass ply 61 can be enhanced in the tire vulcanization step. Therefore, the resultant pneumatic tire can have excellent air permeation resistance and durability, since the inner liner is satisfactorily bonded with the rubber layer of carcass ply 61.

In FIG. 9(d), polymer laminate PL is composed of first layer PL1 and SIB-based layer PL3 and SIS-based layer PL2 as a second layer, laminated in the order listed above. When polymer laminate PL is used as the inner liner of the pneumatic tire, if a surface of SIS-based layer PL2 is arranged toward the tire radial outer side so as to contact carcass ply 61, adhesive strength between SIS-based layer PL2 and carcass ply 61 can be enhanced in the tire vulcanization step. Therefore, the resultant pneumatic tire can have excellent air permeation resistance and durability, since the inner liner is satisfactorily bonded with the rubber layer of carcass ply 61.

<Method for Manufacturing Pneumatic Tire>

The pneumatic tire in accordance with the present invention can be manufactured using an ordinary manufacturing method. An inner liner is manufactured using polymer laminate PL. The inner liner is used for a green tire for pneumatic tire 11 and vulcanization-molded together with other members, and thereby the pneumatic tire can be manufactured. When polymer laminate PL is arranged in the green tire, SIS-based layer PL2 or SIB-based layer PL3 as the second layer of polymer laminate PL is arranged toward the tire radial outer side so as to contact carcass ply 61. With such an arrangement, adhesive strength between SIS-based layer PL2 or SIB-based layer PL3 and carcass ply 61 can be enhanced in the tire vulcanization step. The resultant pneumatic tire can have excellent air permeation resistance and durability, since the inner liner is satisfactorily bonded with the rubber layer of carcass ply 61.

EXAMPLES

<Polymer Laminate>

The styrene-based thermoplastic elastomers (SIB, SIBS, and SIS) used to manufacture the polymer laminate composed of the first layer and the second layer used as the inner liner in accordance with the present invention were prepared as described below.

[SIB]

In a 2 L reaction vessel equipped with a stirrer, 589 mL of methylcyclohexane (dried over molecular sieves), 613 mL of n-butyl chloride (dried over molecular sieves), and 0.550 g of cumyl chloride were charged. After cooling the reaction vessel to −70° C., 0.35 mL of α-picoline (2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for another 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating the polymer, and the resultant polymer was dried at 60° C. for 24 hours to obtain a styrene-isobutylene diblock copolymer (styrene component content of 15% by mass, weight-average molecular weight of 70,000).

[SIBS]

"SIBSTAR 102 (Shore A hardness of 25, styrene component content of 25% by mass, weight-average molecular weight of 100,000)" manufactured by Kaneka Corporation was used.

[SIS]

D1161JP (styrene component content of 15% by mass, weight-average molecular weight of 150,000) manufactured by Kraton Performance Polymers Inc. was used.

<Method for Manufacturing Inner Liner>

The styrene-based thermoplastic elastomer such as the SIBS, SIS, SIB, or the like described above was charged into a twin-screw extruder (screw diameter: φ50 mm; L/D: 30; cylinder temperature: 220° C.) to obtain pellets. Thereafter, the inner liner was fabricated with a T-die extruder (screw diameter: φ80 mm; L/D: 50; die gap width: 500 mm; cylinder temperature: 220° C., film gauge: 0.3 mm).

<Unvulcanized Rubber Sheet>

In the present invention, the carcass ply was used as the unvulcanized rubber sheet, and its topping rubber had formulation described below.

<Formulation A of Topping Rubber>

| | |
|---|---|
| natural rubber (*1) | 100 parts by mass |
| carbon black (*2) | 50 parts by mass |
| zinc white (*3) | 3 parts by mass |
| antioxidant (*4) | 0.2 parts by mass |
| sulfur (*5) | 1 part by mass |
| vulcanization accelerator (*6) | 1 part by mass |
| vulcanization assistant (*7) | 1 part by mass |

(*1) TSR20
(*2) "Seast V" (N660, N2SA: 27 m²/g) manufactured by Tokai Carbon Co., Ltd.
(*3) zinc oxide (ZnO): "Zinc White No. 1" manufactured by Mitsui Mining & Smelting Co., Ltd.
(*4) "Noclac 6C" manufactured by Ouchi Shinko Chemical Industrial Co., Ltd.
(*5) "Sulfur Powder" manufactured by Tsurumi Chemical Industry Co., Ltd.
(*6) "Nocceler DM" manufactured by Ouchi Shinko Chemical Industrial Co., Ltd.
(*7) stearic acid: "Stearic Acid Lunac S30" manufactured by Kao Corporation <Manufacturing of Pneumatic Tire>

Manufacturing of a pneumatic tire in accordance with the present invention was performed based on the assembly step, the cutting step, and the joining step described above. Pneumatic tires of examples and comparative examples as indicated in detail in Table 1 were manufactured. A green tire was subjected to press molding at 170° C. for 20 minutes for vulcanization, the vulcanized tire was cooled at 100° C. for 3 minutes without being taken out of a vulcanization mold, and thereafter the vulcanization tire was taken out to manufacture a pneumatic tire of 195/65R15 size having a basic structure shown in FIG. 8.

Figure 6:
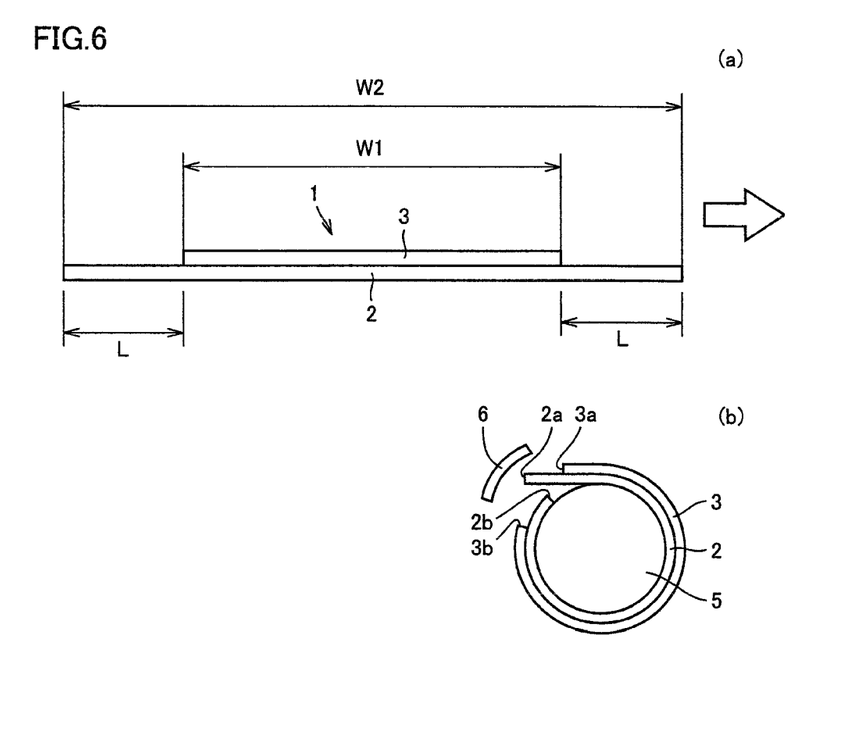

Examples 1 and 2 are cases where displaced distance (amount) L between the inner liner and the carcass ply based on FIG. 4 is 50 mm and 500 mm, respectively, and Example 3 is a case where displaced distance (amount) L between the inner liner and the carcass ply based on FIG. 6 is 250 mm. In Comparative Examples 1 to 3, displaced distance (amount) L is 0, 40 mm, and 600 mm, respectively. Examples 1, 2, and 3 are all excellent in overall judgment on air-in performance, flex crack growth, rolling resistance properties, and static air pressure drop rate.

TABLE 1

| | | | Comparative Example 1 | Comparative Example 2 | Comparative Example 3 | Example 1 | Example 2 | Example 3 |
|---|---|---|---|---|---|---|---|---|
| Inner liner | First layer: SIBS layer | thickness (mm) | 0.25 | 0.25 | 0.25 | 0.25 | 0.25 | 0.25 |
| | Second layer: SIS layer | thickness (mm) | 0.05 | — | 0.05 | 0.05 | — | 0.05 |
| | SIB layer | thickness (mm) | — | 0.05 | — | — | 0.05 | — |
| | Inner liner dimension | length (mm) | 1300 | 1300 | 1300 | 1300 | 1300 | 1300 |
| Carcass ply | Rubber formulation | | formulation A | formulation A | formulation A | formulation A | formulation A | formulation A |
| | Ply dimension | length (mm) | 1300 | 1260 | 700 | 1250 | 800 | 800 |
| Displaced amount between inner liner and carcass ply in width direction (mm) | | | 0 | 40 | 600 | 50 | 500 | 250 |
| Performance evaluation | Air-in performance | | B | C | C | A | A | A |
| | Flex crack growth | | poor | poor | good | good | good | good |
| | Rolling resistance index | | 100 | 99 | 99 | 101 | 101 | 102 |
| | Static air pressure drop rate | | 2.7 | 2.8 | 2.6 | 2.5 | 2.4 | 2.3 |
| | Overall judgment | | B | B | B | A | A | A |

<Performance Test>

Performance evaluation was performed on the pneumatic tires manufactured as described above, in the following manner.

<Air-In Performance>

The inside of each vulcanized tire was examined by appearance, and evaluated as follows:

A: In appearance, per tire, the number of air-in portions with a diameter of 5 mm or less and the number of air-in portions with a diameter of more than 5 mm were both 0.

B: In appearance, per tire, the number of air-in portions with a diameter of 5 mm or less was one to three, and the number of air-in portions with a diameter of more than 5 mm was 0.

C: In appearance, per tire, the number of air-in portions with a diameter of 5 mm or less was four or more, and the number of air-in portions with a diameter of more than 5 mm was one or more.

<Flex Crack Growth>

A durability driving test was performed to make an evaluation based on whether the inner liner was broken or peeled off. Each prototype tire was mounted on a JIS standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to observe crack or peel-off of an inner joint.

Good: no crack or peel-off due to the inner joint was observed.

Poor: Crack or peel-off due to the inner joint occurred.

<Rolling Resistance Index>

Each prototype tire was mounted on a JIS standard rim 15×6JJ, and rolling resistance was measured while driving the tire at room temperature (30° C.) under the conditions of a load of 3.4 kN, an air pressure of 230 kPa, and a speed of 80 km/hour, using a rolling resistance tester manufactured by KOBE STEEL, LTD. Based on the following calculation formula, a rolling resistance change rate (%) in each example was expressed as an index, using the value in Comparative Example 1 as a reference value (100). It shows that the greater the rolling resistance change rate, the smaller the rolling resistance.

(rolling resistance index)=(rolling resistance in Comparative Example 1)/(rolling resistance in each example)×100

<Static Air Pressure Drop Rate>

Each prototype tire was mounted on a JIS standard rim 15×6JJ, and an initial air pressure of 300 kPa was sealed therein. Then, the tire was left at room temperature for 90 days and thereafter an air pressure drop rate was calculated. The smaller the value, the less likely the air pressure is to be reduced, which is preferable.

<Overall Judgment>

Judgment A is made when all of the following conditions are satisfied:
(a) Air-in performance is evaluated as A
(b) Flex crack growth is evaluated as "good"
(c) Rolling resistance change rate is 100 or more
(d) Static air pressure drop rate (%/month) is 2.6 or less Judgment B is made when one of the following conditions is satisfied. If a plurality of judgments were made, a judgment with lower evaluation was adopted.
(a) Air-in performance is evaluated as B or C
(b) Flex crack growth is evaluated as "poor"
(c) Rolling resistance change rate is less than 100
(d) Static air pressure drop rate (%/month) is 2.7 or more

INDUSTRIAL APPLICABILITY

The method for manufacturing the pneumatic tire in accordance with the present invention is applicable to methods for manufacturing pneumatic tires for passenger cars, trucks and buses, heavy equipment, and the like.

REFERENCE SIGNS LIST

1: laminate; 2: inner liner; 3: unvulcanized rubber sheet; 4: cut sheet; 5: drum; L: displaced distance (amount); 11: pneumatic tire; 12: tread part; 13: sidewall part; 14: bead part; 15: bead core; 16: carcass ply; 17: belt layer; 18: bead apex; 19: inner liner; PL: polymer laminate; PL1: first layer; PL2: SIS-based layer; PL3: SIB-based layer.

The invention claimed is:

1. A method for manufacturing a pneumatic tire from a green tire by molding, the pneumatic tire having an inner liner on an inner side of the tire, said molding of the green tire comprising:
(a) an assembly step of bonding the inner liner and an unvulcanized rubber sheet with end portions thereof in a width direction being displaced from each other by 50 mm to 500 mm in the width direction to manufacture a laminate, wherein said inner liner has a width formed to be larger than a width of said unvulcanized rubber sheet, and both ends of the width direction of the unvulcanized rubber sheet are located on the inside in the width direction of both ends of the width direction of the inner liner;
(b) a cutting step of cutting said laminate to have a constant length corresponding to a width of a drum to manufacture a cut sheet; and
(c) a joining step of winding said cut sheet on entire circumference of the drum such that a cut surface thereof extends in a circumferential direction of the drum and the inner liner is disposed on an inner surface side, and joining the both end portions of the width direction of said inner liner so that the end portions are overlapped each other,
said inner liner being a composite layer of
a first layer consisting of a styrene-isobutylene-styrene block copolymer and having a thickness of 0.05 mm to 0.6 mm, and
a second layer consisting of a thermoplastic elastomer composition consisting of a styrene-isobutylene block copolymer, having a thickness of 0.01 mm to 0.3 mm, and disposed on a side of said unvulcanized rubber sheet.

2. The method for manufacturing the pneumatic tire according to claim 1, wherein, in said joining step, the both end portions of the unvulcanized rubber sheet are joined using an unvulcanized rubber piece.

3. The method for manufacturing the pneumatic tire according to claim 1, wherein said unvulcanized rubber sheet is a carcass ply.

* * * * *